Patented Aug. 18, 1925.

1,550,512

UNITED STATES PATENT OFFICE.

FELIX CREMER, OF SANTIAGO, CHILE.

FLOTATION PROCESS.

No Drawing.   Application filed January 28, 1921. Serial No. 440,754.

*To all whom it may concern:*

Be it known that I, FELIX CREMER, a citizen of Peru, residing at Santiago, Chile, have invented certain new and useful Improvements in Flotation Processes, of which the following is a specification.

The object of this invention is to facilitate the separation of substances, intimately associated as mixtures, either in the form of powders or coarse materials. In order to bring these latter within the scope of the process, they will have to be reduced first to powder. The process resembles those now in operation which make use of screens, wet or dry, magnetic and electro-static concentrators, etc., and especially those of flotation, which make use of bubbles to which some of the components of the mixture adhere, without affecting the others, and thereby produce their separation.

At present, those froths, as well as the separation they perform, are procured by means of a variety of substances to which, for lack of a better word, the name of "oils" has been applied, or more specifically "flotation oils," although they cannot all be characterized as oils, in the ordinary meaning of the word. All these substances have the property in common of being either gases, liquids or solids, all more or less soluble in the medium within which it is desired to effect the separation.

The purpose of this process is to substitute, for reasons that will appear further on, insoluble solids in place of the soluble solids, liquid or gases. Ordinarily, this is an impossible task, because the solids are not present in a sufficiently fine state of subdivision to permit their remaining in suspension in the medium, or to form a froth with the same, or, finally, to coat the particles in the medium in such a way as to permit their being affected and separated by the froth.

This purpose might be accomplished if the insoluble solid agent of flotation were submitted to a process of comminution sufficiently complete to give it the characteristics of, though not making it identical with a liquid. But, in practice such a proceeding would be impracticable by reason of the elevated cost that it would entail. On the other hand, the same object can be obtained by utilizing the well-known property of many substances to assume that state of extreme subdivision which is called "colloidal" or, "semi-colloidal," submittting the substances to some simple processes. Among these appear as the most practical and convenient the chemical processes, without, detriment, however, to the possibility of employing other methods when the conditions demand them.

One of the principal uses to which the faculty of froths, to effect separations of the kind described above, is being applied is the dressing or concentrating of ores, known under the name of flotation. It is in these cases that my invention can often advantageously replace the present methods. Take, for instance, a mixture of copper ores, composed partly of oxides, sulphides and gangue, it being desired to separate the former from the latter. This is not feasible with the present methods, because only the sulphides adhere to the froth, and the oxides remain with the gangue.

According to my invention, I would dissolve the copper in the oxidized part of the copper ores, probably with sulphuric acid, and would separate it again from the solution by means of some of the reagents which precipitate copper in form of sulphide, like sulphuretted hydrogen, or any other reagent that will produce the same effect. Inasmuch, as the copper sulphide precipitated in this form is present in the colloidal or semi-collidal state, in its properties it approaches that of a liquid, without, however, becoming one in fact. On the contrary, it retains its characteristics of a solid, as is proved by the fact that in this condition, besides producing a froth, the latter completely raises all the copper in the form of sulphide, which had previously been in solution, together with the natural sulphides, which could not have been floated without this colloidal copper sulphide, or, for that matter, one of the well-known "flotation-oils."

In this way it is possible to separate the total copper contained in the ore from the gangue by flotation, without the application of these "flotation-oils," and only taking advantage of the presence of the sulphide of some metal in the colloidal state.

The advantages of this process are obvious, since they permit, as in the illustration given, the separation of the copper, when present in the form of oxides, together with the sulphides, in the same bath. If there are not oxides present, it is possible to add a small quantity of some soluble copper salt, as for instance copper sulphate and precipitate the copper therefrom as colloidal or semi-colloidal sulphide, and accomplish the purpose of floating the natural sulphide without the assistance of an oil. By way of analogy it is to be expected that the same will happen with other materials, for instance the minerals of other metals, the metals themselves in elemental form, or any other substances in the shape of powder, from which one or more components susceptible to the influence of those colloids, are to be separated. Similarly, it is more than probable that, in order to secure the same effects, not only colloidal copper sulphides, but also those of other metals, and other colloids, will do as well. All these will be accomplished without the use of flotation-oils, reagents that possess many inconveniences in their application, from the point of view of cost, as well as from other considerations.

It has been heretofore proposed that colloidal sulphur may act as a floating agent, apparently in a similar manner as the colloidal substances described in this application. There is no evidence at hand, either in practice or in theory, that such is actually the case, but, if it should be true, that discovery is strictly restricted to colloidal sulphur, and no other substances, while my discovery consists in the fact that many other colloidal or semi-colloidal substances will perform the same service, if they have the property of so affecting certain materials that their separation can be accomplished from other materials that are not so affected. Accordingly, if colloidal sulphur really possesses the same property, it would have to be excluded from the scope of the present invention.

In using the expression "colloidal or semi-colloidal" substances the intention is to include all those that are not finely enough, or molecularly, divided to form true solutions in a given solvent, nor large enough to prevent them from affecting the materials to be separated in the manner indicated, in the medium in which the separation is to be performed.

Whenever, in this application, use is made of the expression: "copper oxides," "oxides of copper," or "copper in the oxidized form," the intention is to include within the term all such copper compounds, as carbonates, silicates, sulphates, etc., from which the copper can be taken into solution by a simple treatment with some suitable solvent, and the same applies to other metals than copper, in the oxidized state.

Accordingly, I claim:

1. The process of selectively separating components of metallic ores, consisting in adding to the pulp containing such mixtures a colloid made up of freshly precipitated metallic sulfid of the metal to be separated, and subjecting the pulp to froth flotation through the exclusive use of such metallic sulfid.

2. The process of selectively separating components of metallic ores, consisting in adding to the pulp containing such mixtures a metallic colloid of the freshly precipitated metallic sulfid of a character corresponding to the metallic component to be floated, and subjecting the pulp to froth flotation through the exclusive use of such sulfid.

3. The process of separating the metallic components of copper ores, consisting in adding to the pulp containing such mixtures a freshly precipitated copper sulfid as a colloidal agent, and subjecting the pulp so treated to froth flotation through the exclusive use of such sulfid.

In testimony whereof I affix my signature.

FELIX CREMER.